United States Patent
Lubberhuizen

(10) Patent No.: US 10,474,732 B2
(45) Date of Patent: Nov. 12, 2019

(54) DIGITAL SAMPLE RATE CONVERSION

(71) Applicant: Dialog Semiconductor B.V., 's-Hertogenbosch (NL)

(72) Inventor: Wessel Lubberhuizen, Delden (NL)

(73) Assignee: Dialog Semiconductor B.V., 's Hertogenbosch (NL)

( * ) Notice: Subject to any disclaimer, the term of this patent is extended or adjusted under 35 U.S.C. 154(b) by 117 days.

(21) Appl. No.: 15/631,067

(22) Filed: Jun. 23, 2017

(65) Prior Publication Data
US 2017/0371840 A1 Dec. 28, 2017

(30) Foreign Application Priority Data

Jun. 24, 2016 (GB) .................................. 1611083.5

(51) Int. Cl.
| | |
|---|---|
| *G06F 17/17* | (2006.01) |
| *G06F 7/78* | (2006.01) |
| *G06F 17/16* | (2006.01) |
| *H04L 29/06* | (2006.01) |

(Continued)

(52) U.S. Cl.
CPC .............. *G06F 17/17* (2013.01); *G06F 7/78* (2013.01); *G06F 17/16* (2013.01); *H04L 65/60* (2013.01)

(58) Field of Classification Search
CPC ........... G06F 17/16; G06F 17/17; G06F 7/78; G06K 9/00496; H04B 1/00; H04B 1/0003; H04L 65/60
See application file for complete search history.

(56) References Cited

U.S. PATENT DOCUMENTS

| | | | |
|---|---|---|---|
| 2006/0248133 A1 | 11/2006 | Li | |
| 2008/0147761 A1* | 6/2008 | Melanson | .......... H03H 17/0283 708/313 |

(Continued)

OTHER PUBLICATIONS

"Implementation of the Transposed Farrow Structure," by Djordje Babic et al., IEEE International Symposium on Circuits and Systems, 2002. ISCAS 2002, May 26-29, 2002, pp. IV-5 to IV-8.

(Continued)

*Primary Examiner* — Wesley J Tucker
(74) *Attorney, Agent, or Firm* — Saile Ackerman LLC; Stephen B. Ackerman

(57) ABSTRACT

Methods, structures and computer program products for digital sample rate conversion are presented. An input digital sample with a first frequency is converted to an output sample with a second frequency. A sample rate conversion circuit is provided which provides an enhanced transposed farrow structure that enables an optimised trade-off between noise levels and computational complexity. Each output sample is derived by convolution of a continuous time interpolation kernel with a continuous time step function representing the input sample stream. In a sample rate conversion structure, there is a trade-off between the quality and the computational complexity. The quality is defined as a ratio between the (wanted) signal power and the (unwanted) noise power. The computational complexity may be defined as the average number of arithmetic operations that are required to generate one output sample. A higher computational complexity will generally lead to a higher power consumption and larger footprint.

9 Claims, 9 Drawing Sheets

(51) Int. Cl.
*H04B 1/00* (2006.01)
*G06K 9/00* (2006.01)

(56) References Cited

U.S. PATENT DOCUMENTS

2009/0319065 A1* 12/2009 Risbo ............... G11B 20/10527
　　　　　　　　　　　　　　　　　　　　　　　　700/94
2014/0029511 A1* 1/2014 Park ................... H04L 27/2627
　　　　　　　　　　　　　　　　　　　　　　　　370/328

OTHER PUBLICATIONS

"Sample Rate Conversion by Trapezoidal Interpolation for Software Defined Radio," by Xiaojing Huang et al., 14th IEEE Proceedings on Personal, Indoor and Mobile Radio Communications, 2003, PIMRC 2003, Sep. 7-10, 2003, pp. 135-139.
"Polynomial Interpolators for High-Quality Resampling of Oversampled Audio," by Olli Niemitalo, http://www.student.oulu.fi/~oniemita/DSP/INDEX.HTM oniemitalo@sublevel3.org, pp. 1-65.
"Continuous-Time Digital Filters for Sample-Rate Conversion in Reconfigurable Radio Terminals," by Tim Hentschel et al., Frequenz, Journal of RF-Engineering and Telecommunications, vol. 55, Issue 5-6, May 2001, 6 pgs.

* cited by examiner

DIGITAL SAMPLE RATE CONVERSION

TECHNICAL FIELD

The present disclosure relates to digital sample rate conversion and in particular to methods, structures and computer program products for sample rate conversion, whereby an input digital sample with a first frequency is converted to an output sample with a second frequency.

BACKGROUND

In order to be processed by digital systems, a continuously varying signal needs to be converted to a set of discrete samples. A sample is a value or a set of values at a point in the domain in which the continuously varying signal is sampled.

It is often desired to convert the sampling rate of a digital signal from one rate to another, for example in audio, video or image processing systems where data needs to be processed by different sub-systems or components which require different sampling rates.

Sample rate conversion can be implemented with a structure that provides various electronic components which are arranged to store and perform arithmetic operations on data to implement algorithms for sample rate conversion, converting an input signal having a first sample rate to an output signal having a second sample rate. Sample rate conversion structures may be suitably provided as a digital signal processor (DSP) device or as a component part of DSP device which also performs other functions. A DSP device provides suitable software and hardware architecture for power-efficient processing of algorithms for portable devices or other applications where there is a great need for power efficiency.

SUMMARY

When designing a sample rate conversion structure, there is a trade-off between the quality and the computational complexity. In this context, the quality may be defined as a ratio between the (wanted) signal power and the (unwanted) noise power. The computational complexity may be defined as the average number of arithmetic (such as multiply or add) operations that are required to generate one output sample. A higher computational complexity will generally lead to a higher power consumption and larger footprint (in terms of the required amount of memory, and the required physical circuit area). It is desired to have a better trade-off between these factors. According to a first aspect of the disclosure there is provided a method of converting a stream of input samples to stream of output samples, comprising deriving each output sample by convolution of a continuous time interpolation kernel with a continuous time step function representing the input sample stream.

Optionally, each input sample is separated by an input sample interval and convolution of a continuous time interpolation kernel with a continuous time step function representing the input sample stream comprises calculating a weighted sum of the continuous time impulse response integrated over all values of the input sample stream over the output sample interval.

Optionally, each output sample is separated by an output sample interval; and:
(a) at the start of each output sample interval the last known input sample is stored;
(b) if a new input sample arrives during the course of the output sample interval, the stored value is updated;
(c) step (b) is repeated for any other new input samples; and
(d) at the end of the output sample interval the output sample is calculated based on the stored or updated value.

Optionally, the last known input sample is stored using an accumulate and load unit.

An accumulate and load unit may be any suitable circuit, device or code that provides for the storage and summation of a plurality of values and arranged so that upon receipt of a trigger signal it makes the accumulated value available and resets itself to a defined value.

Optionally, the interpolation kernel comprises a piecewise polynomial function of a given polynomial order, and comprises matrix coefficients which are generated from coefficients of a transposed Farrow structure of a polynomial order lower than said given polynomial order.

Optionally, the interpolation kernel comprises a B-spline interpolator.

Optionally, the interpolator coefficients define a symmetric phase range.

According to a second aspect of the disclosure there is provided a structure for converting a stream of input samples to stream of output samples, being arranged to derive each output sample by convolution of a continuous time interpolation kernel with a continuous time step function representing the input sample stream.

Optionally, the structure implements a polynomial interpolator and comprises:
a phase generation unit, that computes a new phase value by adding a phase change to a previous phase and triggers generation of an output sample;
a comb filter that computes a differential signal, formed by subtracting a previous input from a current input value;
one or more multipliers that multiply the differential signal by powers of the new phase value;
an accumulate-and-load unit, which is loaded with the previous input sample value upon generation of an output sample;
one or more accumulate and dump units, which are reset to zero upon generation of a new output sample;
a matrix multiplication unit, that forms multiple outputs using constant coefficient multiplication of values from the accumulate and load and the accumulate and dump units; and
a delay-and-add unit, that adds delayed versions of the outputs of the matrix multiplication unit.

According to a third aspect of the disclosure there is provided a non-transitory computer program product storing instructions that, when executed by a computing device, enable the computing device to convert a stream of input samples to stream of output samples, comprising deriving each output sample by convolution of a continuous time interpolation kernel with a continuous time step function representing the input sample stream.

The computer program product may be stored on or transmitted as one or more instructions or code on a computer-readable medium. Computer-readable media includes both computer storage media and communication media including any medium that facilitates transfer of a computer program from one place to another. A storage media may be any available media that can be accessed by a computer. By way of example such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fibre optic cable, twisted pair, digital subscriber line (DSL), or wireless technologies such as infra-red, radio, and microwave, then the coaxial cable, fibre optic cable, twisted pair, DSL, or wireless technologies such as infra-red, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The instructions or code associated with a computer-readable medium of the computer program product may be executed by a computer, e.g., by one or more processors, such as one or more digital signal processors (DSPs), general purpose microprocessors, ASICs, FPGAs, or other equivalent integrated or discrete logic circuitry.

BRIEF DESCRIPTION OF THE DRAWINGS

The disclosure will be described below, by way of example only, with reference to the accompanying drawings, in which.

DESCRIPTION

It is often desired to convert between arbitrary sample rates, and to enable this an approximation of the continuous signal needs to be created and then sampled. This process is called interpolation.

Consider an input signal $x(kT_1)$ sampled at one rate, which needs to be converted to an output signal $y(mT_2)$ sampled at a different rate. This is shown schematically in FIG. 1. $T_1$ is the time interval between each of the k samples for the input signal $x(kT_1)$ (k representing the order of the sample of the input signal) and $T_2$ is the time interval between each of the m samples for the output signal $y(mT_2)$ (m representing the order of the sample of the output signal).

Figure 1:
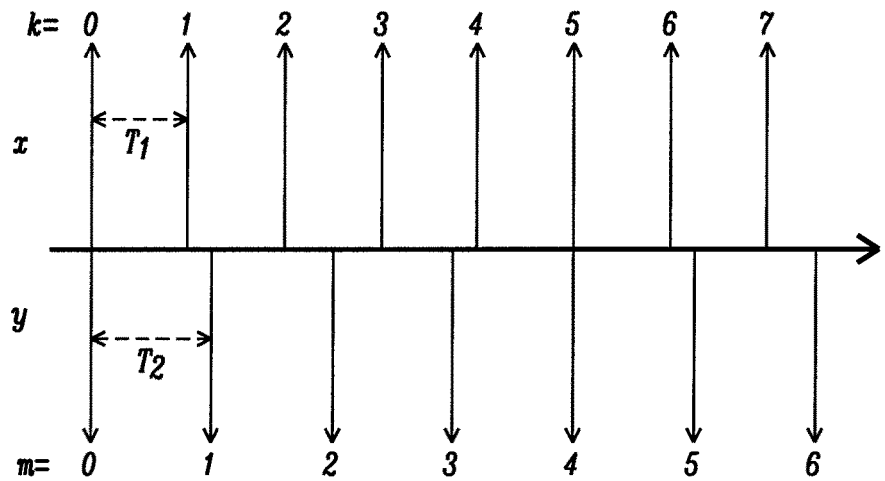
FIG. 1 shows an input signal x(kT1) sampled at one rate, which needs to be converted to an output signal y(mT2) sampled at a different rate.

A sample rate conversion (SRC) equation relating the output signal to the input signal and describing the filtering and re-sampling of SRC for the case in FIG. 1 is:

$$y(mT_2) = \sum_{k=-\infty}^{\infty} x(kT_1) \cdot h(mT_2 - kT_1) \qquad [1]$$

h(t) is the continuous-time impulse response of the required signal, which delivers the signal $y(mT_2)$ at the new sample rate from the input signal $x(kT_1)$ at the old sample rate. Or, putting it another way, h(t) is a function representing the action the required filter performs on the input signal to convert it to the output signal. Equation [1] describes a time-varying system.

It should be noted that we have Rational Factor SRC if $$\frac{T_1}{T_2} = \frac{L}{M}$$

with L,M∈N_+. If L=1 or M=1, we have Integer Factor SRC (i.e. one of the sample rates is an exact multiple of the other sample rate). If L=M=1, we have discrete-time convolution (i.e. no SRC at all).

Generally, the complete continuous-time impulse response h(t) must be known. For rational and integer value SRC, described above, the system described by equation [1] varies periodically with time. So, only certain values of h(t) are actually required for the computation.

In order to simplify calculating the samples of h(t) which are required, we look for simple functions describing continuous time impulse responses. It has been found that, since polynomials are an example of such simple functions, polynomial filters are useful in SRC. We limit the class of polynomial filters to piecewise polynomial impulse responses composed from pieces of equal length. Given polynomial pieces of degree Q and length Δ, we may derive an expression for h(t) as follows:

$$h(t) = \sum_{q=0}^{Q} c_q \left( \left\lfloor \frac{t}{\Delta} \right\rfloor \right) \cdot \left( \frac{t}{\Delta} - \left\lfloor \frac{t}{\Delta} \right\rfloor \right)^q, \; 0 \leq t < N\Delta \qquad [2]$$

Where $c_q$ is the coefficient for the q-th order polynomial.

There are two choices for Δ which simplify equation [2], namely $\Delta = T_1$ and $\Delta = T_2$. Using equation [2] and equation [1] above and setting $\Delta = T_1$ gives:

$$y(mT_2) = \sum_{q=0}^{Q} \tilde{x}_q(mT_2) \cdot (\mu_m)^q \qquad [3]$$

where $$\tilde{x}_q(mT_2) = \sum_{k=-\infty}^{\infty} x(kT_1) \cdot c_q\left(\left\lfloor m\frac{T_2}{T_1} - k \right\rfloor\right) \qquad [4]$$

and

-continued $$\mu_m = \frac{mT_2}{T_1} - \left\lfloor m\frac{T_2}{T_1} \right\rfloor \in [0, 1) \qquad [5]$$

$\lfloor \alpha \rfloor$ denotes the floor operation i.e. $\lfloor \alpha \rfloor$ denotes the greatest integer a' such that a'≤a.

$\mu_m$ is the inter-sample position, i.e. the distance between the previous input signal and the current output signal (see FIG. 1) and has no units.

Figure 2:
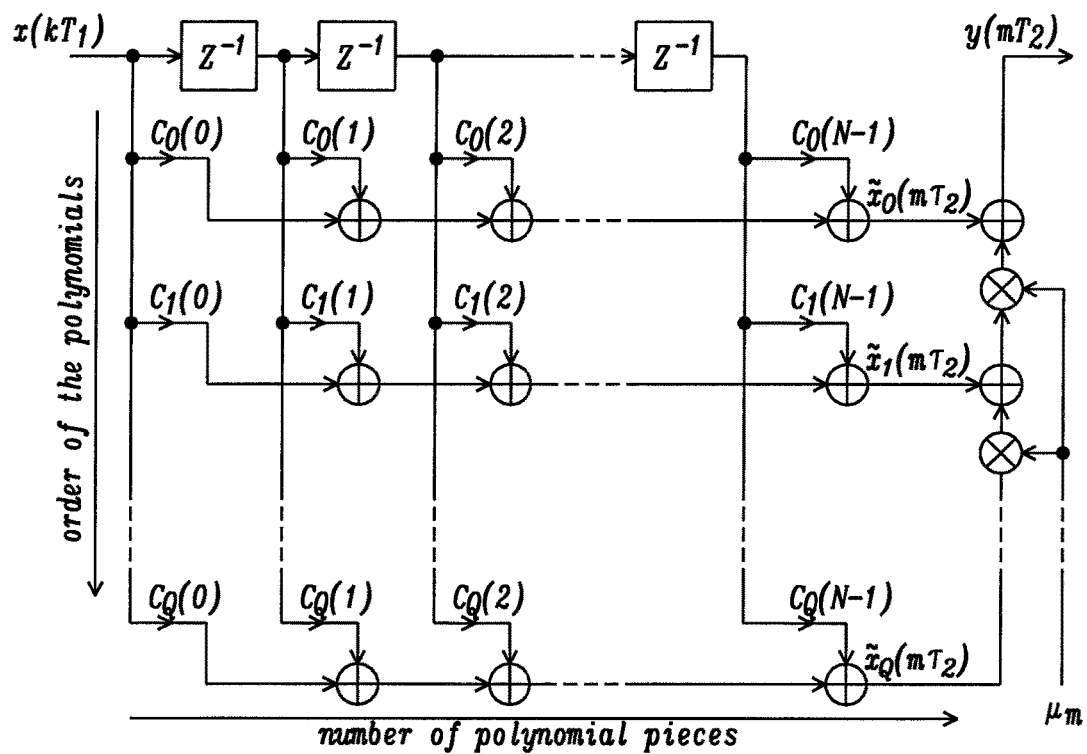
FIG. 2 shows a Farrow structure for sample rate conversion.

The above equations [3], [4] and [5] represent an implementation of SRC known as the Farrow structure and FIG. 2 shows a schematic illustration of such a structure, in which there are N polynomial pieces (0 to N−1) and the order (q) of the polynomials is from 0 to Q.

The Farrow structure shown in FIG. 2 can also be interpreted as a polyphase interpolator with an infinite number of polyphase branches that are implemented by just one "reference" polyphase branch, and a polynomial description of how to calculate the remaining ones. The "reference" polyphase branch can be obtained by setting $\mu_m$=0 in equation [3]. It represents the samples of the impulse response h(t) which mark the starting points of the individual polynomial pieces. These starting points (i.e. the "reference" branch) and the order of the connecting polynomial pieces determine the transfer characteristics of the SRC system.

In the Farrow structure equations [3], [4] and [5] above, the higher the order of the polynomial pieces, the better the impulse response h(t) can be matched to the application. If high order polynomials are not feasible, it is also possible to use shorter polynomials of lower order. In that case, more "reference" polyphase branches (i.e. starting points of polynomial pieces) are required. This can be achieved by decreasing the length of the polynomial pieces by a factor J, that is:

$$\Delta = \frac{T_1}{J} \qquad [6]$$

This may be thought of as a generalization of the Farrow structure so is commonly known as the generalized Farrow structure.

Since equation [6] provides us with a generalization compared with the case where $\Delta=T_1$, we can skip the case where $\Delta=T_2$ and, instead, immediately set $$\Delta = \frac{T_2}{J}. \qquad ([7])$$

Substituting equations [6] and [7] into equation [2] above, we have:

$$y(mT_2) = \sum_{q=0}^{Q} \sum_{k=-\infty}^{\infty} x_q(kT_1) \cdot c_q\left(mJ - \left\lceil kJ\frac{T_1}{T_2} \right\rceil\right) \qquad [8]$$

where $$x_q(kT_1) = r(kT_1) \cdot (\mu_k)^q \qquad [9]$$

and $$\mu_k = \left\lceil kJ\frac{T_1}{T_2} \right\rceil - kJ\frac{T_1}{T_2} \in [1, 0) \qquad [10]$$

Note that when J=1, we return to the original Farrow structure and $\mu_k$ becomes equal to $\mu_m$, the previously defined inter-sample position.

Figure 3:
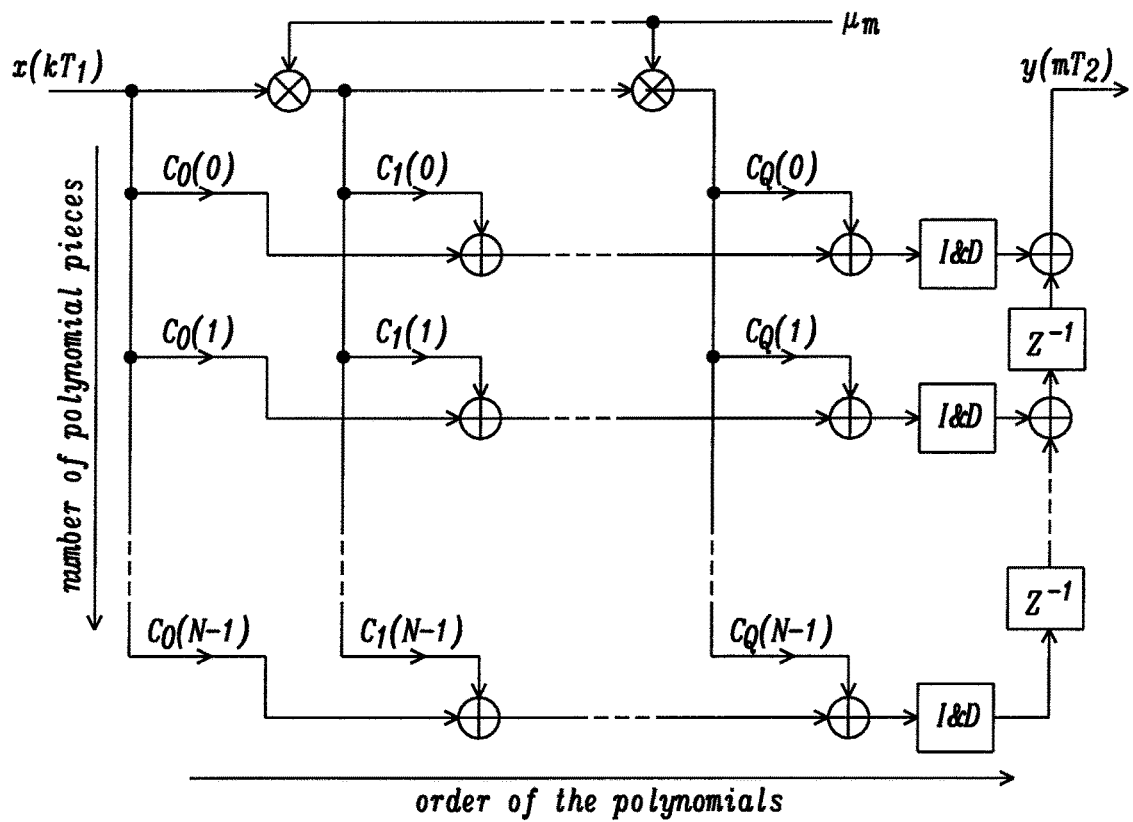
FIG. 3 shows a Transposed Farrow structure for sample rate conversion.

Equations [8], [9] and [10] above describe the Farrow structure when the piece length Δ of the polynomial pieces is defined by equation [7] above, and is known as the Transposed Farrow Structure (TFS). FIG. 3 shows a schematic illustration of such a TFS for J=1 and in which there are N polynomial pieces (0 to N−1) and the order (q) of the polynomials is from 0 to Q. Note that, in a real implementation, J is always equal to 1.

The Farrow Structure provides an efficient way to implement a sampling rate increase between arbitrary sampling rates, and can be seen as a polynomial polyphase interpolator. However, the transfer zeros of the filter are clustered around the integer multiples of the input sampling rate which means that the Farrow structure is subject to aliasing when implementing a sampling rate decrease. The Transposed Farrow structure is suitable for implementing a sample rate decrease, because its transfer zeros are clustered around the integer multiples of the output sample rate, while using the same polynomial functions as the Farrow structure. It can be seen as a polynomial polyphase decimator which can provide anti-aliasing.

While both the Farrow structure and Transposed Farrow structure can in principle convert sample rates between arbitrary values, because of imaging and aliasing problems in practice a DSP can be provide with either a Farrow structure and be used only for increasing a sample rate, or with a Transposed Farrow structure and be used only for decreasing a sample rate. If a DSP is to be provided which can handle arbitrary sample rate conversion with improved imaging or aliasing properties, then it must have both a Farrow structure and a Transposed Farrow structure, together with a detection device that compares the sample rate of an incoming signal with the sample rate of a target output signal and makes an appropriate selection between either the Farrow structure or the Transposed Farrow Structure depending on whether the output sample rate is respectively higher or lower than the input sample rate. Implementing both structures is costly in terms of power consumption and die area, while implementing only one of the structures limits the functionality of the DSP. It is desired to provide a sample rate converter with one or more of improved functionality, reduced power consumption, reduced computational complexity or reduced die area.

Figure 4:
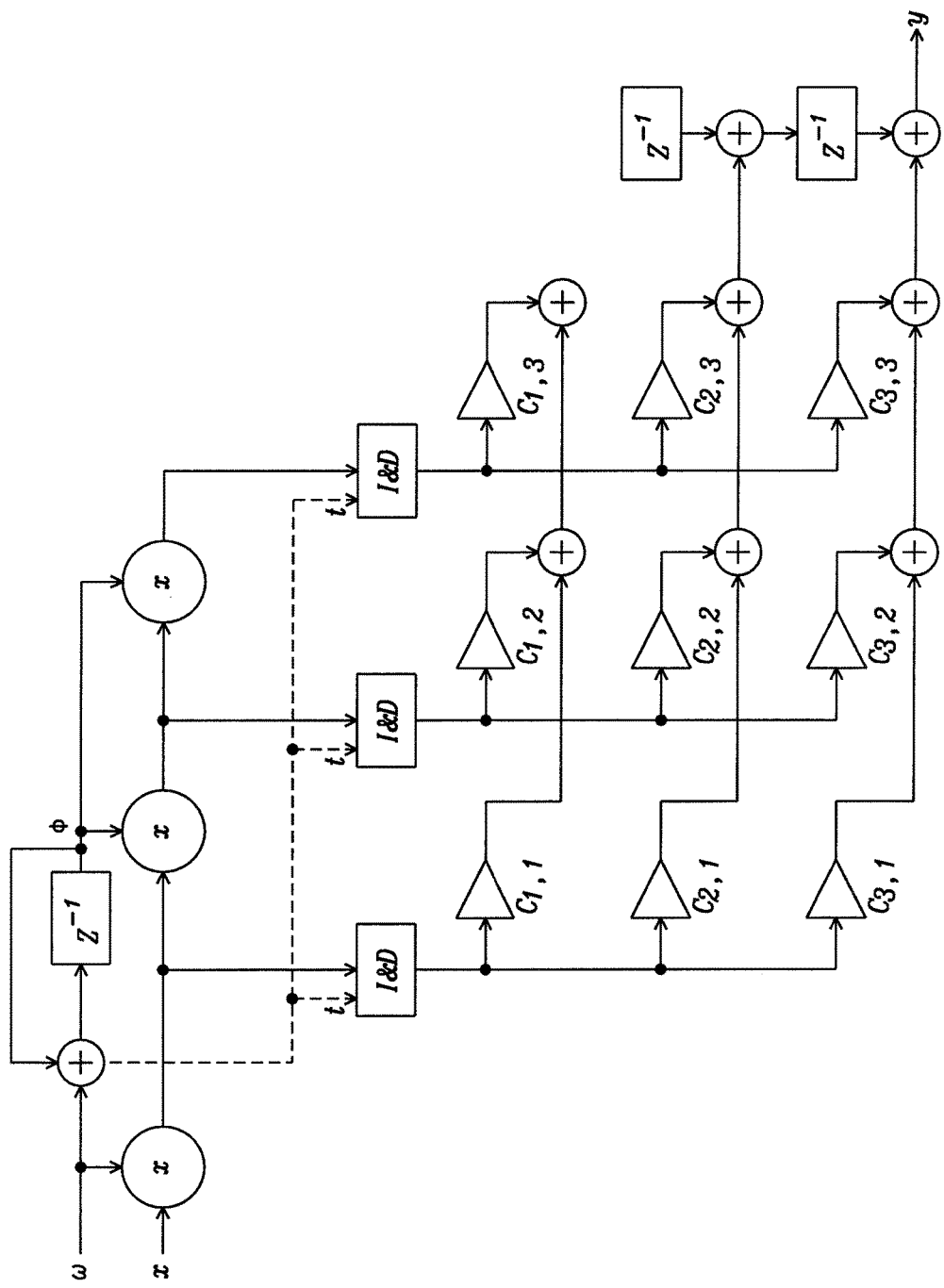
FIG. 4 shows an alternative structure for another type of modified Farrow Structure.

A modified Transposed Farrow Structure is described in Babic, D.; Vesma, J.; Saramaki, T.; Renfors, M., "Implementation of the transposed Farrow structure," *ISCAS* 2002. *IEEE International Symposium on Circuits and Systems*, vol. 4, no., pp. IV-5,IV-8 vol. 4, which is hereby incorporated by reference. This describes a Transposed Farrow Structure that is implemented using fewer multipliers for cases where decimation ratio is high. If the input sampling rate is high relative to the output sampling rate, the required number of bits to represent the fractional interval for each input sample is small, and so the multiplication of a signal with a high sample rate with the fractional interval can be realised with simple additions. The structure for this modified Farrow Structure is shown in FIG. 4.

However, while this is more computationally efficient than the Transposed Farrow Structure of FIG. 3, it is only applicable for certain use-cases where the decimation ratio is unusually high; and there is still a need to address the problems noted above.

Figure 5:
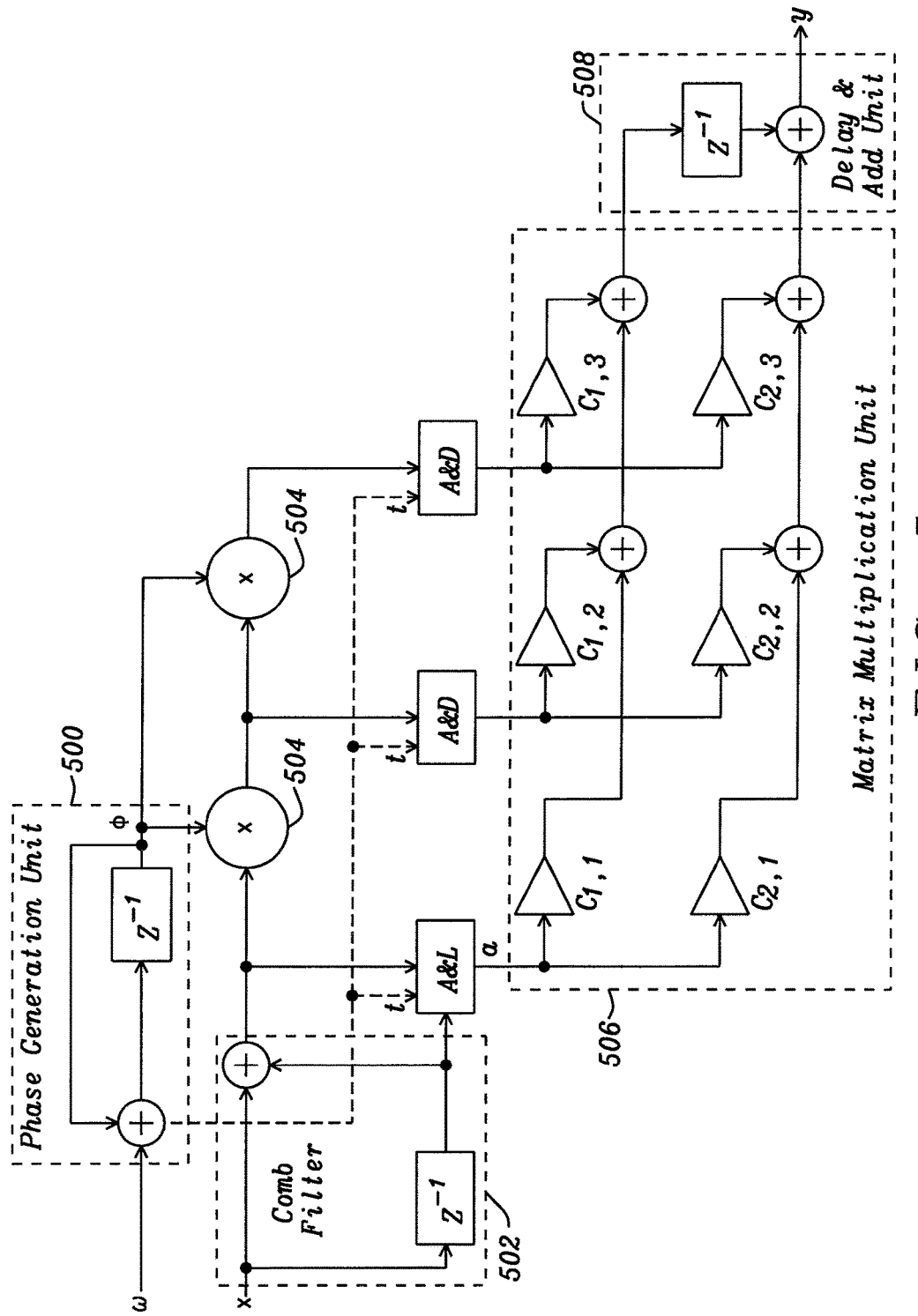
FIG. 5 shows a sample rate converter according to an embodiment of the present disclosure.

FIG. 5 shows an embodiment of a sample rate converter according to an embodiment of the present disclosure, illustrating in this example a second order polynomial interpolation.

In FIG. 5 the following notation is used:
x=the input sample
y=the output sample
ω=phase increment
ϕ=phase
A&L=Accumulate-and-load unit
A&D=Accumulate-and-dump unit
▷=constant coefficient multiplier
$z^{-1}$=delay element
$c_{i,j}$=constant coefficient values
+=adder with optional negated inputs (marked with '−').
⊗=variable input multiplier
t=trigger input (generated upon phase wrap around)
This structure includes:
A phase generation unit 500, that computes a new phase value by adding a phase change to a previous phase and triggers generation of an output sample.
A comb filter 502 that computes a differential signal, formed by subtracting the previous input from the current input value.
One or more multipliers 504 that multiply the differential signal from the comb filter 502 by powers of the wrapped phase value.
An accumulate-and-load unit (A&L), which is loaded with the previous input sample value upon generation of an output sample.
One or more accumulate and dump units (A&D), which are reset to zero upon generation of a new output sample.
A matrix multiplication unit 506, that forms multiple outputs using constant coefficient multiplication of integrate and load/integrate and dump values. The coefficients of the matrix are $c_{ij}$, where i is an index of the order of the polynomials and j is an index of the polynomial pieces.
A delay-and-add unit 508, that adds delayed versions of the outputs of the matrix.

As described above, a general equation describing the filtering and resampling of a sample rate converter is:

$$y(mT_2) = \sum_{k=-\infty}^{\infty} x(kT_1) \cdot h(mT_2 - kT_1)$$

Where h(t) is a continuous time impulse response, $T_1$ is the input sampling period, $T_2$ is the output sampling period, $x(kT_1)$ is the input sample sequence and, $y(mT_2)$ is the output sample sequence. In effect, an output sample is a weighted sum of the continuous time impulse response h(τ) at discrete time differences τ=$mT_2$−$kT_1$.

The present disclosure provides an enhanced resampling scheme, where the continuous time response h(t) is integrated over all values instead of only summed at discrete time differences:

$$y(mT_2) = \sum_{k=-\infty}^{l=\infty} x(kT_1) \cdot \int_0^{T_1} h(mT_2 - kT_1 - \tau) d\tau$$

In the Farrow Structure, the function h(t) is a piecewise polynomial function:

$$h(t) = h_j\left(\frac{t - jT_2}{T_2}\right)$$

$$\text{Where } j = \text{floor}\left(\frac{t}{T_2}\right)$$

The polynomial sections $h_j(t)$ can be defined as:

$$h_j(t) = \sum_{i=0}^{n-1} c_{i,j} \cdot t^i$$

For each polynomial section j we can define the following function:

$$H_j(t) = \int_t^1 h_j(t) dt$$

$$H_j(t) = \sum_{i=0}^{n-1} c_{i,j} - \sum_{i=1}^{n} \frac{c_{i-1,j}}{i} \cdot t^i$$

Hj(t) is a function that applies a coefficient matrix to the polynomial sections of the continuous time response h(t).

The enhanced sample rate converter evaluates the definite integral mentioned earlier $$y(mT_2) = \sum_{k=-\infty}^{l=\infty} x(kT_1) \cdot \int_0^{T_1} h(mT_2 - kT_1 - \tau) d\tau$$

by using an initial guess, followed by refinement stages.

At the start of each interval $T_2$, the initial guess is that there will be no new incoming sample over that interval. The last known sample, $x_{prev}$ is loaded in the first accumulator, and the other accumulators are reset to zero. Whenever an incoming sample $x_{prev}$ arrives, this guess needs to be refined. The refinement is $(x_{new}-x_{prev})^i$, using again the assumption that there will not be an additional incoming sample over the rest current interval. Subsequently the last known sample is updated to the value of incoming sample. At the end of the interval $T_2$ an output sample is computed and the next interval $T_2$ starts.

A structure according to the disclosure (which may be referred to as an "enhanced" Transposed Farrow Structure, or ETFS) significantly reduces computation complexity compared to a Transposed Farrow Structure of the same order. The Enhanced Transposed Farrow Structure of order 2 requires 2 variable multipliers and 6 constant coefficient multipliers, whereas the Transposed Farrow structure uses 3 variable multipliers and 9 constant coefficient multipliers. Note that he Transposed Farrow Structure requires a dedicated multiplier for multiplication with the phase increment ω, which is not required for the Enhanced Transposed Farrow Structure. The difference in complexity of the accumulate-and-load unit compared to the accumulate-and-dump is very small: For the accumulate-and-load the accumulator is set to a starting value when triggered, and for the accumulate-and-dump the accumulator is reset to zero.

In practice the variable multipliers can be implemented using a single physical multiplier that performs all the required multiplications, by using a system clock that is higher than the input sample rate. In the example where both multipliers are applied (as shown in FIG. 5) the area advantage is less, but the system clock can be run at a lower rate, resulting in a power advantage.

The disclosure is applicable to any polynomial order $N \geq 1$ and any number of segments $L \geq 1$. The size of the corresponding coefficient matrix is L×K, with K=N+1. A convenient way to generate the matrix coefficients for the ETFS of order N is to derive them from the coefficients of the TFS of lower polynomial order N−1, using the following equation:

$$E_{i,j} = \begin{cases} \sum_{k=1}^{K} \frac{F_{i,k}}{k+1} & (j=1) \\ -\frac{F_{i,j-1}}{j} & (2 \leq j \leq K) \end{cases}$$

Where E is a coefficient matrix with dimensions (L×K) of the Enhanced Transposed Farrow Structure, and F is a coefficient matrix L×(K−1) of the Transposed Farrrow Structure.

The disclosure is not limited to any particular interpolation method and there are many methods that can be used. However, in a preferred embodiment a B-spline interpolation is used because this results in coefficients which can be expressed in only a few powers of two (and a common gain factor). As a result, the constant coefficient multipliers can be efficiently implemented as a combination of shift-and-adds.

The coefficient matrices for B-spline interpolation order 0, 1 and 2 are:

$$F^{(0)} = [1]$$

$$F^{(1)} = \begin{bmatrix} 0 & 1 \\ 1 & -1 \end{bmatrix}$$

$$F^{(2)} = \frac{1}{2} \cdot \begin{bmatrix} 0 & 0 & 1 \\ 1 & 2 & -2 \\ 1 & -2 & 1 \end{bmatrix}$$

$$F^{(3)} = \frac{1}{2} \cdot \begin{bmatrix} 0 & 0 & 0 & 1 \\ 1 & 3 & 3 & -3 \\ 4 & 0 & -6 & 3 \\ 1 & -3 & 3 & -1 \end{bmatrix}$$

The coefficients corresponding to Enhanced B-spline interpolation of order 1, 2 and 3 are:

$$E^{(1)} = [1 \quad -1]$$

$$E^{(2)} = \frac{1}{2} \cdot \begin{bmatrix} 1 & 0 & -1 \\ 1 & -2 & 1 \end{bmatrix}$$

$$E^{(3)} = \frac{1}{6} \cdot \begin{bmatrix} 1 & 0 & 0 & -1 \\ 4 & -3 & -3 & 2 \\ 1 & -3 & 3 & -1 \end{bmatrix}$$

$$E^{(4)} = \frac{1}{24} \cdot \begin{bmatrix} 1 & 0 & 0 & 0 & -1 \\ 11 & -4 & -6 & -4 & 3 \\ 11 & -16 & 0 & 8 & -3 \\ 1 & -4 & 6 & -4 & -1 \end{bmatrix}$$

Transposed Farrrow Structures of the type illustrated in FIG. 3 assume that the phase parameter $\phi$ has an asymmetric range [0,1). Modified Transposed Farrow Structures of the type illustrated in FIG. 4 use a symmetric range for the phase parameter, i.e. [−1,1). As a result, the coefficient matrix has more symmetry: all columns are either symmetric or anti-symmetric. This symmetry can be exploited to reduce complexity by sharing multiplications' results.

The coefficients corresponding to Modified B-spline interpolation of order 0,1,2,3 are:

$$MF^{(0)} = [1]$$

$$MF^{(1)} = \begin{bmatrix} 1 & 1 \\ 1 & -1 \end{bmatrix}$$

$$MF^{(2)} = \frac{1}{2} \cdot \begin{bmatrix} 1 & 2 & 1 \\ 6 & 0 & -2 \\ 1 & -2 & 1 \end{bmatrix}$$

$$MF^{(3)} = \frac{1}{6} \cdot \begin{bmatrix} 1 & 3 & 3 & 1 \\ 23 & 15 & -3 & -3 \\ 23 & -15 & -3 & 3 \\ 1 & -3 & 3 & -1 \end{bmatrix}$$

For an Enhanced Farrow Structure according to the disclosure the symmetric phase range modification is also possible. The general formula for transforming a coefficient matrix MTF width dimensions L×(K−1) for a Modified Transposed Farrow Structure to a coefficient matrix EMTF with dimensions L×K for the Enhanced Modified Transposed Farrow Structure is:

$$EMTF_{i,j} = \begin{cases} \frac{1}{2^K} \sum_{k=1}^{K} \frac{MTF_{i,k}}{k+1}(-1)^k & (j=1) \\ \frac{-1}{2^K} \frac{MTF_{i,j-1}}{j} & (2 \leq j \leq K) \end{cases}$$

As a result, all columns with index j>1 will be either symmetric or anti-symmetric.

$$ME^{(1)} = \frac{1}{2} \cdot [1 \quad -1]$$

$$ME^{(2)} = \frac{1}{8} \cdot \begin{bmatrix} 3 & -2 & -1 \\ 1 & -2 & 1 \end{bmatrix}$$

$$ME^{(3)} = \frac{1}{48} \cdot \begin{bmatrix} 7 & -3 & -3 & -1 \\ 16 & -18 & 0 & 2 \\ 1 & -3 & 3 & -1 \end{bmatrix}$$

$$ME^{(4)} = \frac{1}{384} \cdot \begin{bmatrix} 15 & -4 & -6 & -4 & -1 \\ 115 & -92 & -30 & 4 & 3 \\ 61 & -92 & 30 & 4 & -3 \\ 1 & -4 & 6 & -4 & -1 \end{bmatrix}$$

For the same polynomial order, the proposed structure gives much better quality of result than the conventional farrow structure, with lower computational complexity. For a given quality target, the invention allows lower oversampling ratios and/or lower order interpolation to be used than the existing structures, resulting in lower operating frequencies and hence lower power, and lower footprint.

The power spectra in FIGS. 11*a*-11*f* demonstrate these advantages. These plots show the frequency distribution (x-axis, in Hz) of the unwanted noise power (y-axis, in dB) for each type of structure, comparing spectra 1100, 1102, 1104 for TFS structures of order 1, 2 and 3 respectively with spectra 1106, 1108, 1110 for ETFS structures of order 1, 2 and 3 respectively.

The spectra 1100 through 1110 were obtained from simulations, using four full scale sinusoidal input signals with a frequency of 1 kHz, and input sample rate of 44.1 kHz for each of the input signals, and an output sample rate of 48 kHz for each of the output signals. The simulations were done in 64-bit precision floating point logic. Hence quantization noise is expected to be around −300 dBFS. It can be seen from the spectra 1100 through 1110 that for order=2 and order=3, The Enhanced Transposed Farrow Structure provides approximately 50-100 dB better suppression of spurious noise in the audible region (100 Hz-20 kHz). Similar advantages are also obtained for higher orders.

The time domain is also illustrated, in FIGS. 10*a*-10*f*. These plots show the time variance (x-axis, in ms) of the output signal (y-axis, in arbitrary units) for each type of structure, comparing plots 1000, 1002, 1004 for TFS structures of order 1, 2 and 3 respectively with spectra 1006, 1008, 1010 for ETFS structures of order 1, 2 and 3 respectively.

It can be seen that that the first and second order transposed farrow structures show large spikes in the output, which are avoided with the enhanced transposed farrow structure according to the disclosure. In the conventional transposed farrow function the input signal is represented by a series of dirac delta pulses, which are spaced apart by an interval T1. The output samples are computed by convoluting the input signal with a continuous time impulse response h(t). If the width of h(t) is less than sample spacing the output of T1 then the output will consist of convoluted delta pulses, resulting in spikes (fast variations in the output). For an input signal that is constant (nonzero), the output signal will be time varying.

In the Enhanced Transposed farrow structure the input signal is effectively represented by a stepwise function, which is convoluted by a continuous time impulse response h(t). For an input signal that is constant (nonzero), the output signal will become constant as well.

While these spikes in the output of the first and second order transposed farrow structures are associated with spectral components that are outside the audible region, additional headroom in the data path is still required to prevent saturation or wrap around. This is because variations in the output signal result in an increased dynamic range (larger peak-to-peak values). As a result, it requires more bits to accurately represent the signal (preventing clipping), and hence larger multipliers and adders are needed to process signal, resulting in a larger physical area. This additional headroom can be omitted when using the enhanced transposed farrow structure, which allows for a more power and area efficient implementation.

Figure 6:
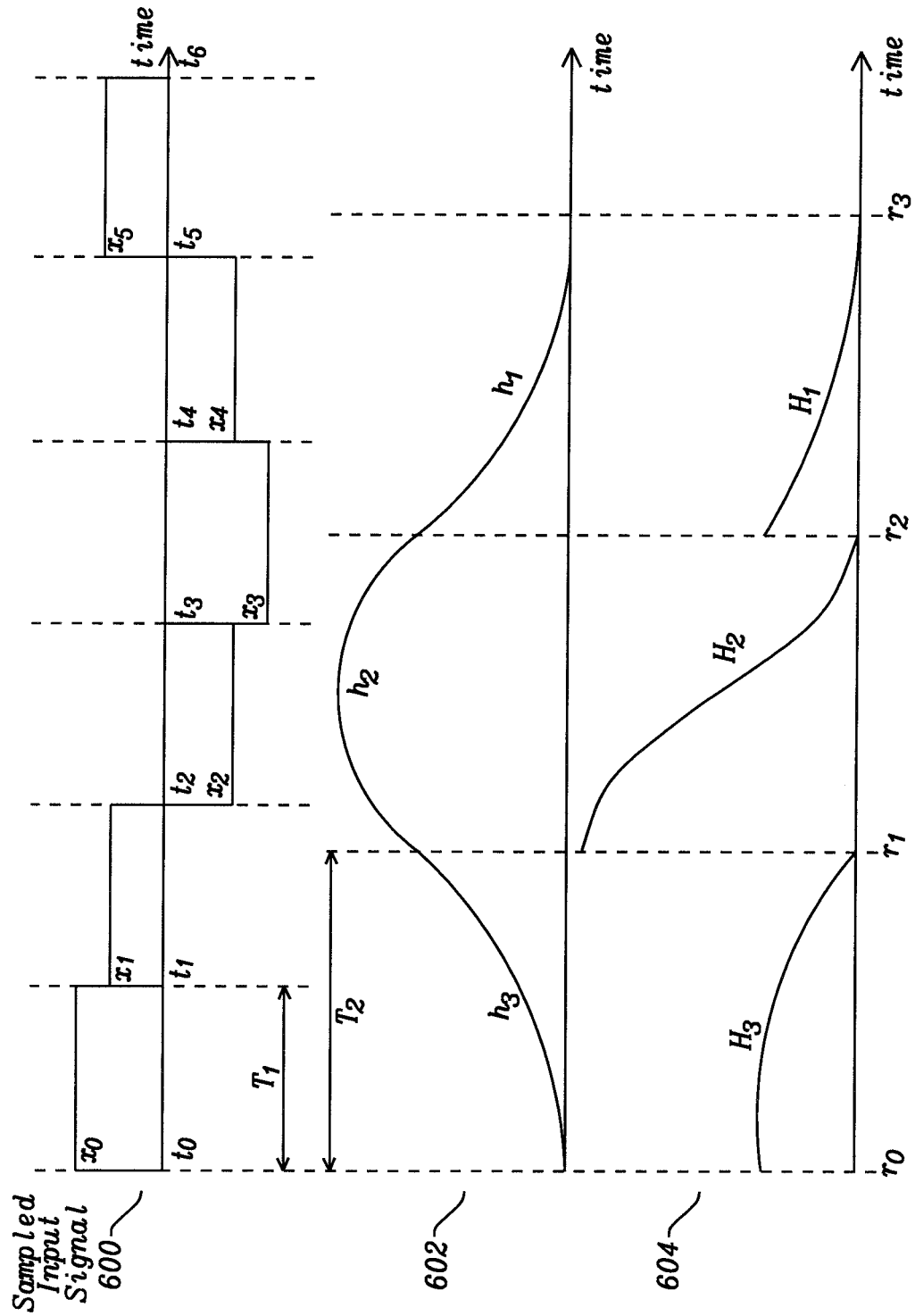
FIG. 6 illustrates the operation of a sample rate conversion according to the disclosure.

To further aid the understanding of the disclosure, FIG. 6 illustrates aspects of the operation of a sample rate conversion according to the disclosure. The top diagram 600 shows a sampled input signal, samples x0 through x5 sampled at times t0 through t5 at time intervals T1. The middle diagram 602 shows a continuous time impulse response h(t) with three portions h3, h2 and h1 at time intervals T2; and the bottom diagram 604 shows a piecewise polynomial function Hj(t) which is a result of applying a coefficient matrix to the polynomial sections of the continuous time response h(t). The coefficient matrix in this embodiment comprises a B-spline interpolation.

Figure 7:
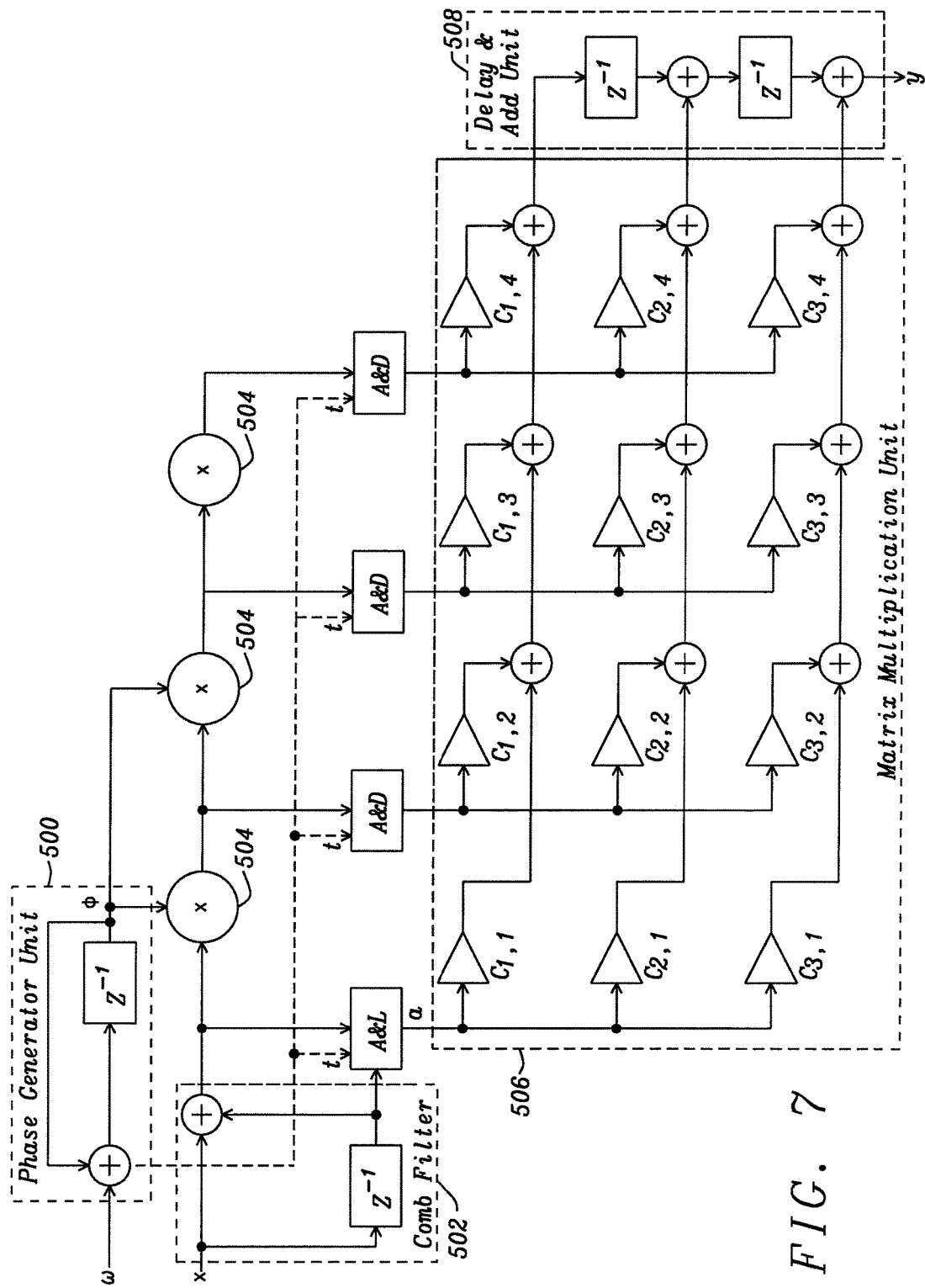
FIG. 7 shows a sample rate converter according to another embodiment of the present disclosure.

FIG. 7 shows a sample rate converter according to another embodiment of the present disclosure, which illustrates an enhanced transposed farrow structure illustrating with a third order polynomial interpolation. The structure of FIG. 7 has similar components as are illustrated in FIG. 5, namely, a phase generation unit 500, comb filter 502, one or more multipliers 504, an accumulate-and-load unit (A&L), one or more accumulate and dump units (A&D), a matrix multiplication unit 506, and a delay-and-add unit 508, that adds delayed versions of the outputs of the matrix.

Compared with the embodiment of FIG. 5, this embodiment has an additional variable input multiplier and accumulate and dump unit; the coefficient matrix 506 has additional constant coefficient multipliers and adders; and the delay and add unit 508 has an additional delay element and adder.

Figure 8:
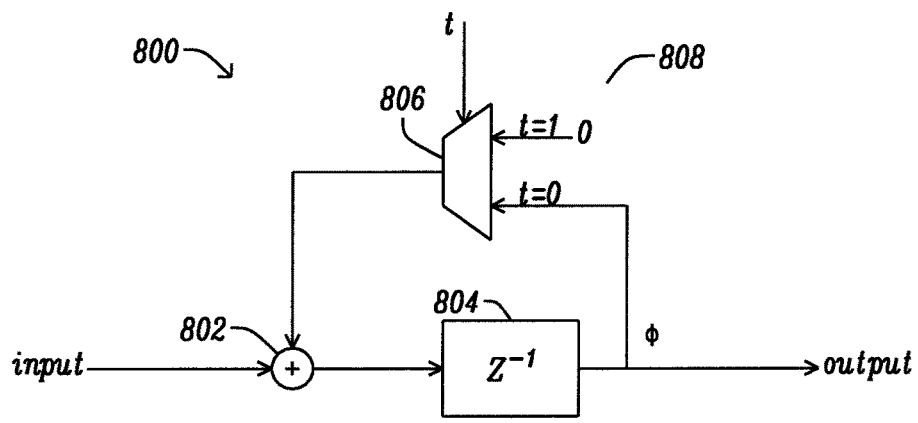
FIG. 8 shows an exemplary structure of an accumulate and dump unit for use with a sample rate converter according to the present disclosure.

An accumulate and dump (A&D) unit may be any suitable circuit, device or code that provides for the storage and summation of a plurality of values and arranged so that upon receipt of a trigger signal it resets the accumulated value to zero, and can output the accumulated value. As an example, FIG. 8 shows an exemplary structure of an accumulate and dump unit for use with a sample rate converter according to the present disclosure.

The accumulate and dump unit 800 comprises an adder 802, a delay element 804 acting as an accumulator, and a multiplexer 806. When the multiplexer 806 receives a trigger signal, t, it resets a value stored at the delay element to zero, as shown by the input 808 at t=1 and outputs the accumulated value, which in this case is a phase value ϕ.

Figure 9:
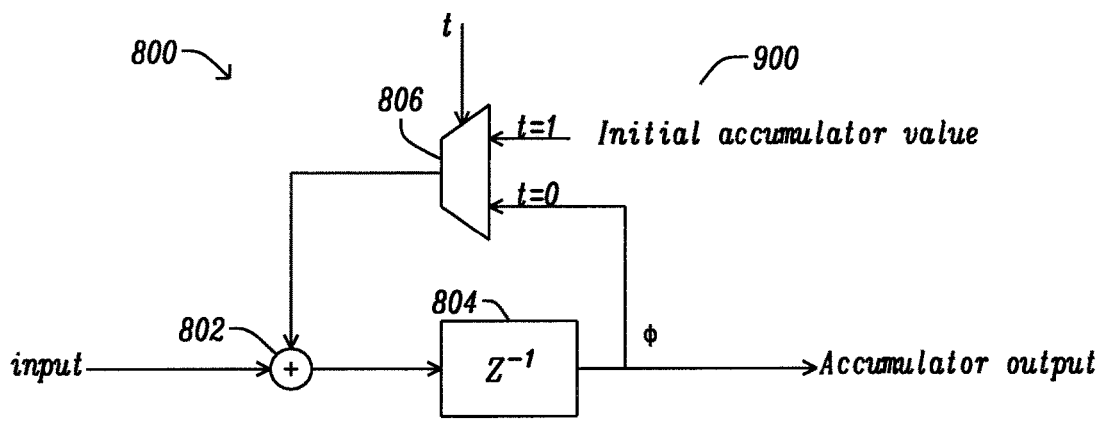
FIG. 9 shows an exemplary structure of an accumulate and load unit for use with a sample rate converter according to the present disclosure.
Figure 10A:
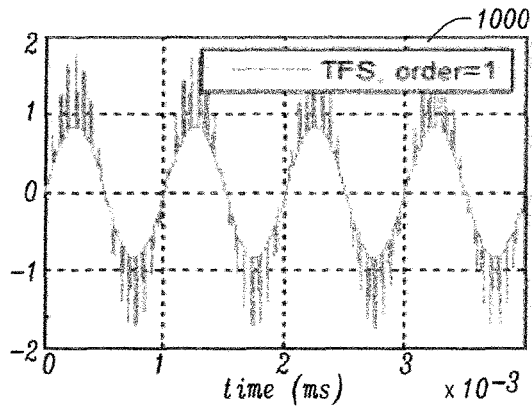
FIGS. 10a-10f shows time domain signals for a prior art Transposed Farrow Structure and for a Transposed Farrow Structure according to an embodiment of the disclosure.
Figure 10D:
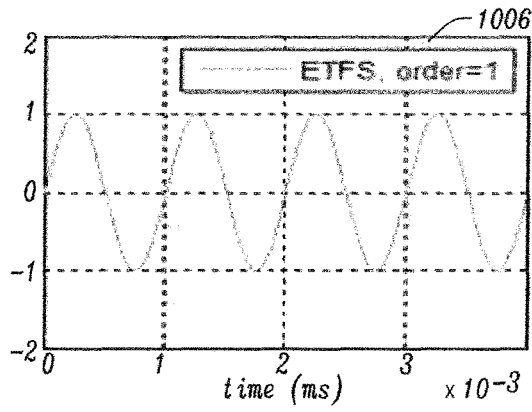
Figure 10B:
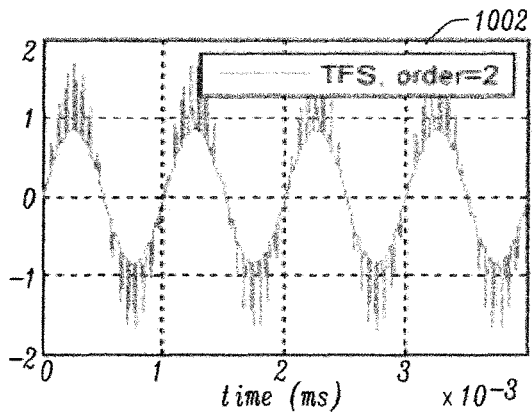
Figure 10E:
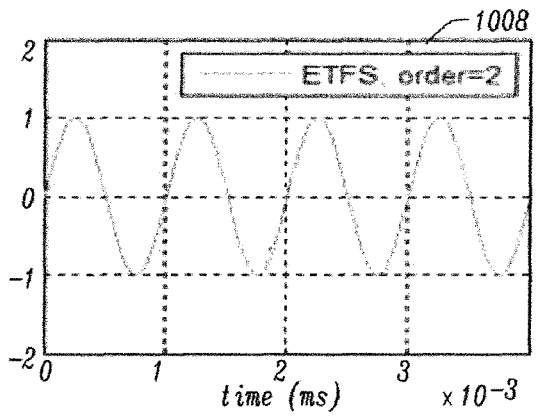
Figure 10C:
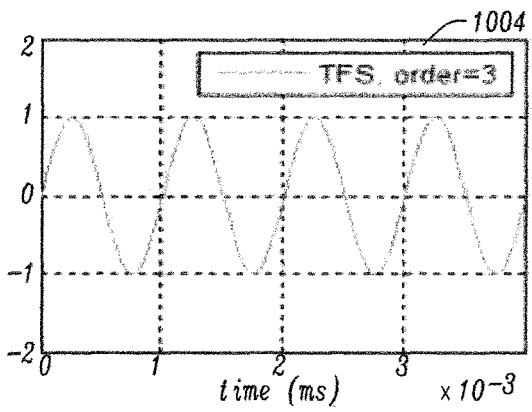
Figure 10F:
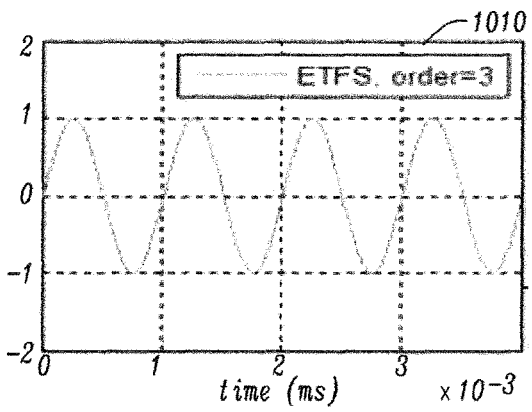
Figure 11A:
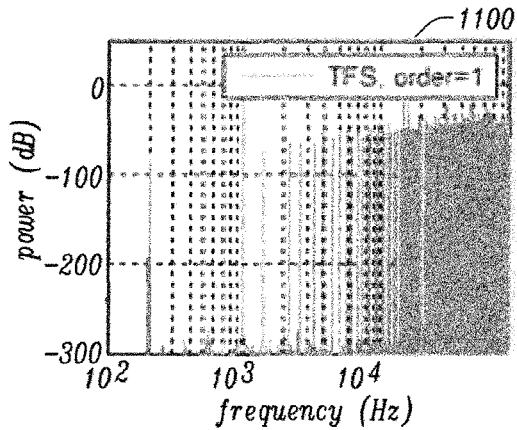
FIGS. 11a-11f shows power spectra for a prior art Transposed Farrow Structure and for a Transposed Farrow Structure according to an embodiment of the disclosure.
Figure 11D:
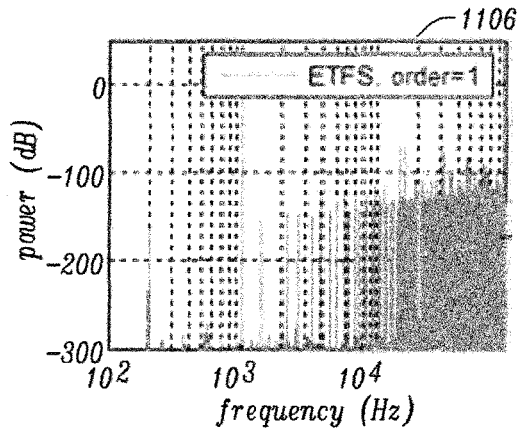
Figure 11B:
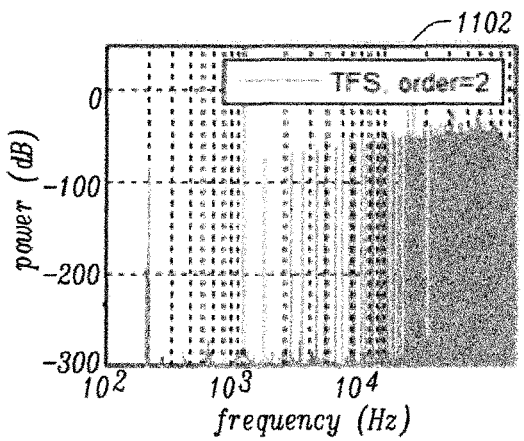
Figure 11E:
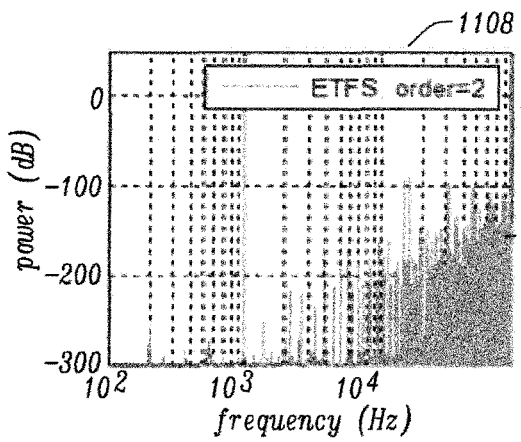
Figure 11C:
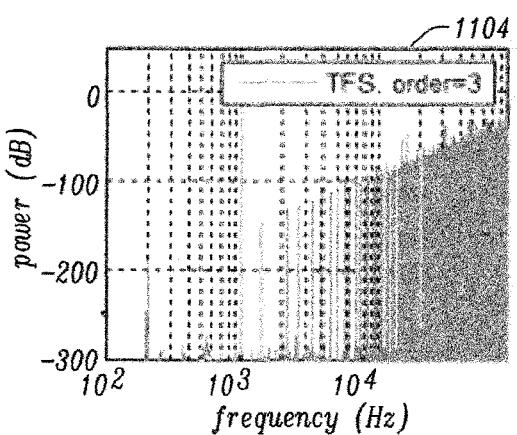
Figure 11F:
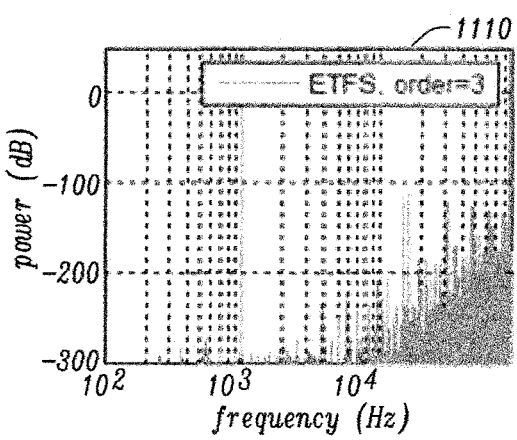

An accumulate and load unit may be any suitable circuit, device or code that provides for the storage and summation of a plurality of values and arranged so that upon receipt of a trigger signal it makes the accumulated value available and resets itself to a defined value. As an example, FIG. 9 shows an exemplary structure of an accumulate and load unit for use with a sample rate converter according to the present disclosure;

The accumulate and load unit 900 comprises an adder 802, a delay element 804 acting as an accumulator, and a multiplexer 806. When the multiplexer 806 receives a trigger signal, t, it resets a value stored at the delay element to an initial accumulator value as shown by the input 900 and outputs the accumulated value, which in this case is a phase value ϕ.

Various modifications and improvements can be made to the above without departing from the scope of the disclosure.

It should be understood that the logic code, programs, modules, processes, methods, and the order in which the respective elements of each method are performed are purely exemplary. Depending on the implementation, they may be performed in any order or in parallel, unless indicated otherwise in the present disclosure. Further, the logic code is not related, or limited to any particular programming language, and may comprise one or more modules that execute on one or more processors in a distributed, non-distributed, or multiprocessing environment.

The method as described above may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multi-chip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A method of converting a stream of digital input samples to a stream of digital output samples for sample rate conversion, comprising the step of:
    deriving each digital output sample by convolution of a continuous time interpolation kernel with a continuous time step function representing the input sample stream,
    wherein each digital output sample is separated by an output sample interval; and:
        (a) at the start of each output sample interval the last known digital input sample is stored;
        (b) if a new digital input sample arrives during the course of the output sample interval, the stored value is updated;
        (c) step (b) is repeated for any other new digital input samples; and
        (d) at the end of the output sample interval the digital output sample is calculated based on the stored or updated value.

2. The method of claim 1, wherein each digital input sample is separated by an input sample interval and convolution of a continuous time interpolation kernel with a continuous time step function representing the input sample stream comprises calculating a weighted sum of the continuous time impulse response integrated over all values of the input sample stream over the output sample interval.

3. The method of claim 1, wherein the last known digital input sample is stored using an accumulate and load unit.

4. The method of claim 1, wherein the interpolation kernel comprises a piecewise polynomial function of a given polynomial order, and comprises matrix coefficients which are generated from coefficients of a transposed Farrow structure of a polynomial order lower than said given polynomial order.

5. The method of claim 1, wherein the interpolation kernel comprises a B-spline interpolator.

6. The method of claim 1, wherein the interpolator coefficients define a symmetric phase range.

7. A sample rate converter for converting a stream of digital input samples to stream of digital output samples, being arranged to derive each digital output sample by convolution of a continuous time interpolation kernel with a continuous time step function representing the input sample stream,
    wherein each digital output sample is separated by an output sample interval; and:
        (a) at the start of each output sample interval the last known digital input sample is stored;
        (b) if a new digital input sample arrives during the course of the output sample interval, the stored value is updated;
        (c) step (b) is repeated for any other new digital input samples; and
        (d) at the end of the output sample interval the digital output sample is calculated based on the stored or updated value.

8. The sample rate converter of claim 7, arranged to implement a polynomial interpolator and comprising:
    a phase generation unit, that computes a new phase value by adding a phase change to a previous phase and triggers generation of an output sample;
    a comb filter that computes a differential signal, formed by subtracting a previous input from a current input value;
    one or more multipliers that multiply the differential signal by powers of the new phase value;
    an accumulate-and-load unit, which is loaded with the previous input sample value upon generation of an output sample;
    one or more accumulate and dump units, which are reset to zero upon generation of a new output sample;
    a matrix multiplication unit, that forms multiple outputs using constant coefficient multiplication of values from the accumulate and load and the accumulate and dump units; and
    a delay-and-add unit, that adds delayed versions of the outputs of the matrix multiplication unit.

9. A non-transitory computer program product storing instructions that, when executed by a computing device, enable the computing device to convert a stream of digital input samples to stream of digital output samples for sample rate conversion, comprising deriving each digital output sample by convolution of a continuous time interpolation kernel with a continuous time step function representing the input sample stream,
    wherein each digital output sample is separated by an output sample interval; and:
        (a) at the start of each output sample interval the last known digital input sample is stored;
        (b) if a new digital input sample arrives during the course of the output sample interval, the stored value is updated;
        (c) step (b) is repeated for any other new digital input samples; and
        (d) at the end of the output sample interval the digital output sample is calculated based on the stored or updated value.

* * * * *